United States Patent Office 2,746,963
Patented May 22, 1956

2,746,963

SUBSTITUTED CHLOROQUINOLINOL COMPOUNDS

Joseph H. Burckhalter, Lawrence, Kans., assignor to Parke, Davis & Company, Detroit, Mich., a corporation of Michigan No Drawing. Application March 19, 1954, Serial No. 417,485

6 Claims. (Cl. 260—286)

This invention relates to new heterocyclic nitrogen compounds and to methods for obtaining the same. More particularly, the invention relates to a new class of 5-chloro-8-quinolinol compounds which in their free base form have the formula:

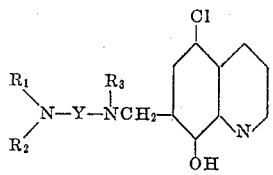

where $R_1$ and $R_2$ are the same or different and represent alkyl or hydroxy alkyl radicals containing from one to ten carbon atoms inclusive or, when taken together with —N<, a saturated heterocyclic radical such as piperidino, morpholino or pyrrolidino group, $R_3$ is hydrogen or a methyl or ethyl radical and Y is a divalent alkylene group containing from two to five carbon atoms.

The products of the invention can be obtained in the free base form having the formula given above or in the form of one of their acid addition salts with inorganic or organic acids. Some examples of these salts are the hydrochloride, hydrobromide, hydroiodide, sulfate, sulfamate, phosphate, citrate, acetate, tartrate, 3-hydroxy-2-naphthoate, 7-iodo-8-hydroxy-quinoline-5-sulfonate, salicylate and the like. With acids, the products form the mono-, di- and tri-salts.

In accordance with the invention, the new quinoline products can be prepared by the condensation of 5-chloro-8-quinolinol of the formula

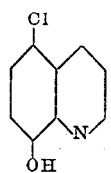

with formaldehyde and an amine of the fourmula:

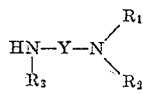

or with equivalent products or mixtures of products resulting from first condensing said amine and formaldehyde; where Y, $R_1$, $R_2$ and $R_3$ have the same significance as given above. The formaldehyde may be supplied as gaseous formaldehyde, aqueous formaldehyde or formaldehyde generating compounds such as paraformaldehyde. The reaction is preferably carried out in an alcoholic type solvent. Some examples of such solvents are methanol, ethanol, n-propanol, isopropanol and the like. The condensation can be brought about by adding the reactants together or by merely allowing the reaction mixture to stand at room temperature. A preferred mode of effecting the condensation is to heat the reaction mixture at the boiling point. If desired, an acid addition salt of the amine, such as the hydrochloride or hydrobromide salt, may be employed in the reaction instead of the free amine. In this instance, the product of the reaction is an acid addition salt of 5-chloro-7-($R_1R_2$-substituted aminoalkylaminomethyl)-8-quinolinol rather than the free base.

The products of the invention are of therapeutic value particularly against *Endameba histolytica*. These new quinolinol compounds may be administered in the form of their free base or more preferably as one of their acid addition salts.

The invention is illustrated by the following examples:

Example 1

A mixture consisting of 4 g. of 5-chloro-8-quinolinol, 1 g. of paraformaldehyde, 2 g. of dimethylaminoethylamine and 100 ml. of alcohol is heated under reflux for 90 minutes. The solvent is removed from the mixture by distillation and the residue is dissolved in ether. The solution is filtered and the filtrate treated with an excess of hydrogen chloride. The insoluble 5-chloro-7-($\beta$-dimethylaminoethylaminomethyl) - 8 - quinolinol dihydrochloride is collected and purified by recrystallization first from methanol and then from ethanol; M. P. 233–235° C. with decomposition. The formula of this product is

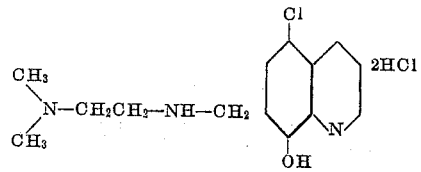

Example 2

A mixture consisting of 9 g. of 5-chloro-8-quinolinol, 1.5 g. of paraformaldehyde and 5.8 g. of diethylaminoethylamine and 500 ml. of alcohol is heated under reflux for 90 minutes. The solvent is removed from the mixture by vacuum distillation and the residue dissolved in ether. The solution is filtered and the filtrate treated with an excess of hydrogen chloride. The gummy yellow solid which precipitates is collected and purified by recrystallization from 95% alcohol to give the desired 5 - chloro - 7 - ($\beta$ - diethylaminoethylaminomethyl) - 8-quinolinol dihydrochloride dihydrate as yellow crystals; M. P. 162–163° C. The formula of this product is

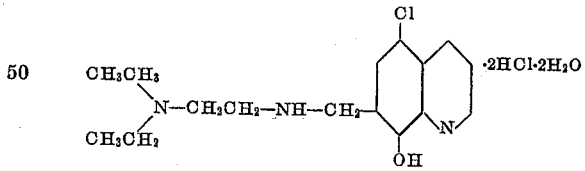

2 g. of 5-chloro-7-($\beta$-diethylaminoethylaminomethyl)-8-quinolinol dihydrochloride is dissolved in water, the solution made alkaline with sodium bicarbonate and the mixture extracted with ether. The ether solution of the free base is dried over anhydrous potassium carbonate and the drying agent removed by filtration. The filtrate is treated with an excess of gaseous hydrogen bromide and the precipitated 5-chloro-7-($\beta$-diethylaminoethylaminomethyl)-8-quinolinol hydrobromide is collected and purified by recrystallization from ethanol.

1 g. of 5-chloro-7-($\beta$-diethylaminoethylaminomethyl)-8-quinolinol dihydrochloride is dissolved in water, the solution is made alkaline with sodium bicarbonate and the liberated free base is extracted with ether. The extract is dried over anhydrous potassium carbonate, the drying agent is removed by filtration and the filtrate is treated with an excess of 85% phosphoric acid. The precipitated phosphate salt is collected and purified by recrystallization from ethanol. The product is 5-chloro-7-

(β-diethylaminoethylaminomethyl) - 8 - quinolinol phosphate.

Example 3

A mixture consisting of 26.8 g. of 5-chloro-8-quinolinol, 4.5 g. of paraformaldehyde and 19.5 g. of diethylaminopropylamine and 250 ml. of alcohol is heated and refluxed for 90 minutes, the solvent is removed from the mixture by vacuum distillation and the residue dissolved in ether. The ether solution is filtered and the filtrate is treated with an excess of hydrogen chloride. The yellow gummy solid which precipitates is collected and purified by recrystallization from absolute alcohol and then from ethanol-methanol to give the desired 5-chloro-7-(γ-diethylaminopropylaminomethyl)-8-quinolinol trihydrochloride; M. P. 201–203° C. with decomposition. The formula of this product is,

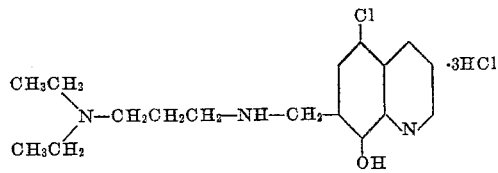

Example 4

A mixture consisting of 10.8 g. of 5-chloro-8-quinolinol, 1.8 g. of paraformaldehyde and 8.5 g. of γ-(N-piperidino)-propylamine and 125 ml. of alcohol is heated and refluxed for 90 minutes. The solvent is removed from the mixture by vacuum distillation and the residue is dissolved in ether. The solution is filtered and the filtrate treated with an excess of hydrogen chloride. The yellow solid which is dried precipitates in vacuo overnight and is purified by recrystallization from absolute ethanol to give the desired 5-chloro-7-(γ-N-piperidinopropylaminomethyl)-8-quinolinol dihydrochloride; M. P. 210–215° C. with decomposition. The formula of this product is,

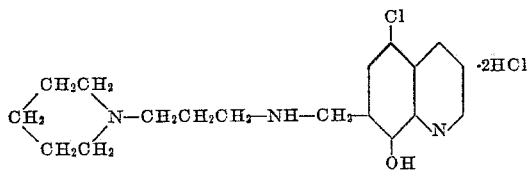

Example 5

A mixture consisting of 10.8 g. of 5-chloro-8-quinolinol, 1.8 g. of paraformaldehyde, 10 g. of omega-N-piperidinoamylamine and 125 ml. of alcohol is heated under reflux for 90 minutes. The solvent is removed by vacuum distillation and the residue dissolved in ether. The solution is filtered and the filtrate treated with an excess of hydrogen chloride. The yellow product which precipitates is dried and recrystallized from absolute alcohol to give the desired 5-chloro-7-(omega-N-piperidinoamylaminomethyl)-8-quinolinol dihydrochloride; M. P. 225–228° C. with decomposition. The formula of this product is,

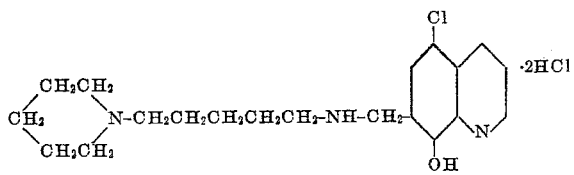

Example 6

A mixture consisting of 9 g. of 5-chloro-8-quinolinol, 1.6 g. of paraformaldehyde, 8.6 g. of γ-heptylaminopropylamine and 15 ml. of alcohol is heated on a steam bath until a thick oily residue is left. The residue is dissolved in acetone, the solution is filtered and the filtrate is treated with an excess of hydrogen chloride. The yellow product which precipitates is collected and purified by recrystallization from absolute ethanol to give the desired 5-chloro-7-(γ-heptylaminopropylaminomethyl)-8-quinolinol dihydrochloride. This product has the formula,

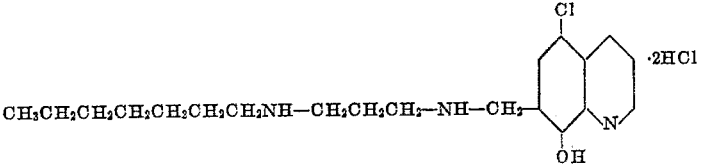

Example 7

A mixture consisting of 9 g. of 5-chloro-8-quinolinol, 1.6 g. of paraformaldehyde, 10.7 g. of γ-decylaminopropylamine and 25 ml. of alcohol is heated under reflux for 90 minutes. The solvent is removed by evaporation and the residue is dissolved in ether. The ethereal solution is filtered and the filtrate treated with an excess of hydrogen chloride. The gummy substance which precipitates is collected and purified by recrystallization from ethanol to give the desired 5-chloro-7-(γ-decylaminopropylaminomethyl)-8- quinolinol dihydrochloride. This product has the formula,

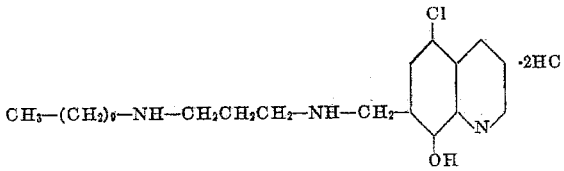

Example 8

A mixture consisting of 17.9 g. of 5-chloro-8-quinolinol, 3.2 g. of paraformaldehyde, 11.8 g. of ethylhydroxyethylaminopropylamine and 50 ml. of alcohol is refluxed for 90 minutes. The solvent is removed from the mixture by evaporation and the residue is dissolved in ether and filtered. The filtered solution is treated with an excess of hydrogen chloride. The yellow product which precipitates is collected and purified by recrystallization from ethanol to give the desired 5-chloro-7-(ethyl-β-hydroxyethylaminopropylaminoethyl)-8-quinolinol dihydrochloride. This product has the formula,

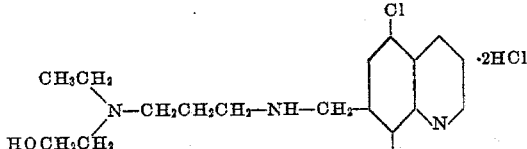

Example 9

A mixture of 17.9 g. of 5-chloro-8-quinolinol, 3.2 g. of paraformaldehyde, 16.2 g. of diethanolaminopropylamine and 25 ml. of alcohol is heated under reflux for 90 minutes. The solvent is removed by evaporation and the residue is dissolved in absolute alcohol and the solution treated with decolorizing charcoal and filtered. The filtrate is treated with an excess of hydrogen chloride. The product which separates is collected and purified by crystallization from absolute alcohol to give the desired 5- chloro-7-(diethanolaminopropylaminomethyl) - 8 - quinolinol dihydrochloride. This product has the formula,

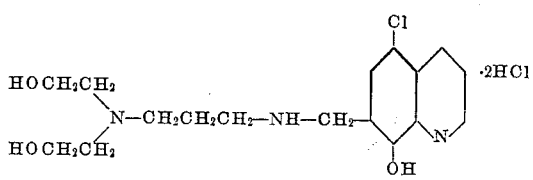

*Example 10*

A mixture of 10.8 g. of 5-chloro-8-quinolinol, 1.8 g. of paraformaldehyde, 7.8 g. of diethylaminoethyl-methylamine and 125 ml. of alcohol is heated under reflux for 90 minutes. The solvent is then removed from the mixture by distillation and the residue is dissolved slowly in ether. The ethereal solution is filtered and the filtrate is treated with an excess of hydrogen chloride. The yellow gum which separates is dried overnight in vacuo and is purified by recrystallization from absolute alcohol to give the desired 5-chloro-7-(diethylaminoethyl-methylaminomethyl)-8-quinolinol dihydrochloride; M. P. 178–182° C. This product has the formula,

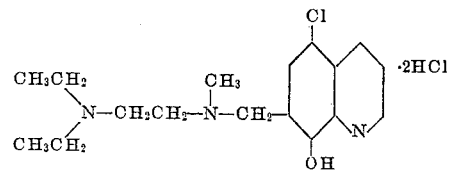

*Example 11*

A mixture consisting of 10.8 g. of 5-chloro-8-quinolinol, 1.8 g. of paraformaldehyde, 8.7 g. of diethylaminopropyl-methylamine and 125 ml. of alcohol is heated under reflux for 90 minutes. The solvent is removed from the mixture by distillation and the residue is dissolved slowly in ether. The ethereal solution is filtered and the filtrate treated with an excess of hydrogen chloride. The yellow gummy solid which precipitates is dried in vacuo and purified by crystallization from absolute ethanol to give the desired 5-chloro-7-(diethylaminopropyl-methylaminomethyl)-8-quinolinol dihydrochloride. This product has the formula,

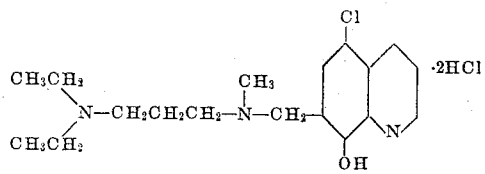

*Example 12*

A mixture consisting of 4 g. of 5-chloro-8-quinolinol, 1 g. of paraformaldehyde, 3.2 g. of diethylaminoethyl-ethylamine and 100 ml. of alcohol is heated under reflux for 90 minutes. The solvent is removed from the mixture by vacuum distillation and the residue dissolved in ether. The ethereal solution is filtered and the filtrate is treated with an excess of hydrogen chloride. The yellow gum which precipitates is collected and purified by recrystallization from absolute alcohol to give the desired 5-chloro-7-(diethylaminoethyl - ethylaminomethyl) - 8 - quinolinol dihydrochloride. This product has the formula,

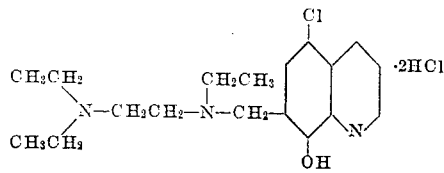

*Example 13*

A mixture of 4 g. of 5-chloro-8-quinolinol, 1 g. of paraformaldehyde, 3.5 g. of diethylaminopropyl-ethylamine and 100 ml. of alcohol is heated under reflux for 90 minutes. The solvent is removed from the mixture by vacuum distillation and the residue is dissolved in ether and filtered. The filtrate is treated with an excess of hydrogen chloride. The material which precipitates is isolated and crystallized from absolute alcohol to give the desired 5-chloro-7-(diethylaminopropyl-ethylaminomethyl)-8-quinolinol dihydrochloride. This product has the formula,

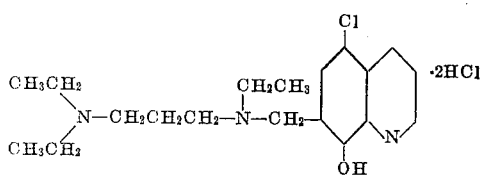

*Example 14*

A mixture of 10.8 g. of 5-chloro-8-quinolinol, 1.8 g. of paraformaldehyde and 8.6 g. of γ-(N-morpholino)-propylamine and 125 ml. of alcohol is heated and refluxed for 90 minutes. The solvent is removed from the reaction mixture by evaporation and the residue is dissolved in ether. The solution is filtered and the filtrate treated with an excess of hydrogen chloride. The material which precipitates is isolated, dried overnight in vacuo and purified by recrystallization from absolute ethanol to give the desired 5-chloro-7-(γ -N - morpholinopropylaminomethyl)-8-quinolinol dihydrochloride. The formula of this product is,

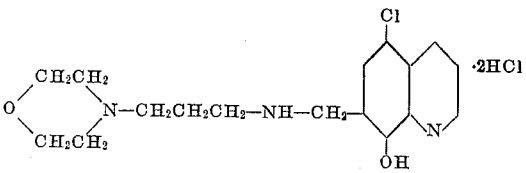

*Example 15*

A mixture of 26.8 g. of 5-chloro-8-quinolinol, 4.5 g. of paraformaldehyde, 15.3 g. of γ-dimethylaminopropylamine and 250 ml. of alcohol is heated at reflux for 90 minutes. The solvent is removed in vacuo and the residue is dissolved in ether and filtered. The filtrate is treated with an excess of hydrogen chloride. The yellow-orange solid which precipitates is collected and purified by recrystallization first from acetone-alcohol mixture and then from alcohol-methanol to give the desired 5-chloro-7-(γ-dimethylaminopropylaminomethyl)-8-quinolinol dihydrochloride; M. P. 204–207° C. with decomposition. This product has the formula,

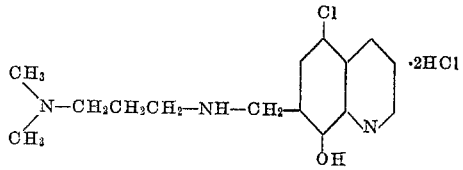

*Example 16*

A mixture of 8.9 g. of 5-chloro-8-quinolinol, 1.5 g. of paraformaldehyde, 7.9 g. of N,N-diethyl-α, delta-pentanediamine and 100 ml. of alcohol is heated at reflux for 90 minutes. The solvent is removed in vacuo and the residue is taken up in ether and filtered. The filtrate is treated with an excess of hydrogen chloride. The product which separates is collected and purified by recrystallization first from hot alcohol, then again from alcohol and finally from absolute alcohol, to give the desired 5-chloro-7-(delta - diethylamino - α - methyl butylaminomethyl)-8-quinolinol trihydrochloride; M. P. 234–236° C. with decomposition. This product has the formula,

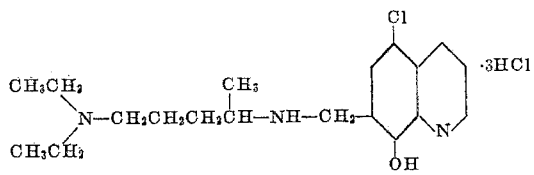

*Example 17*

A mixture of 17.9 g. of 5-chloro-8-quinolinol, 3.2 g. of paraformaldehyde, 12.7 g. of γ-isopropylaminopropylamine, and 50 ml. of absolute alcohol is heated at reflux for 90 minutes. The solvent is removed by evaporation. the residue is dissolved in acetone and the solution treated with an excess of hydrogen chloride. The yellow gum which separates is isolated and purified by recrystallization from absolute alcohol to give the desired 5-chloro-7-(γ-isopropylaminopropylaminomethyl)-8-quinolinol dihydrochloride. This product has the formula,

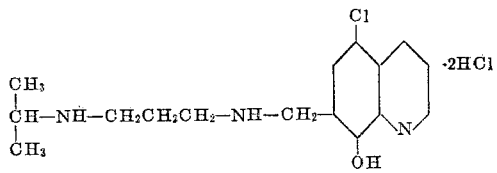

*Example 18*

A mixture consisting of 10.8 g. of 5-chloro-8-quinolinol, 1.8 g. of paraformaldehyde, 9.2 g. of omega-N-pyrrolidinoamylamine and 125 ml. of alcohol is heated under reflux for 90 minutes. The solvent is removed by vacuum distillation and the residue dissolved in ether. The solution is filtered and the filtrate treated with an excess of hydrogen chloride. The product which precipitates is collected, dried overnight in vacuo and purified by recrystallization from absolute ethanol to give the desired 5-chloro-7-(omega-N-pyrrolidinoamylaminomethyl) - 8 - quinolinol dihydrochloride. This product has the formula,

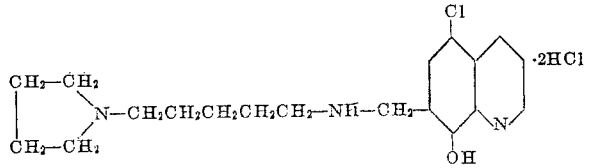

What I claim is:

1. A compound of the class consisting of a free base and its acid addition salts, said free base having the formula,

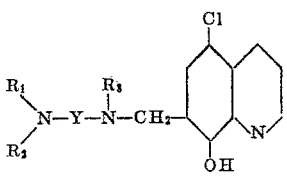

where $R_1$ and $R_2$ are members of the class consisting of alkyl and hydroxy alkyl radicals containing from one to ten carbon atoms inclusive and further members wherein $R_1$ and $R_2$ taken together with —N< form a radical of the class consisting of piperidino, morpholino and pyrrolidino, $R_3$ is a member selected from the class consisting of hydrogen, methyl and ethyl, and Y is a divalent alkylene group containing from two to five carbon atoms.

2. An acid addition salt of a compound having in its free base form the formula,

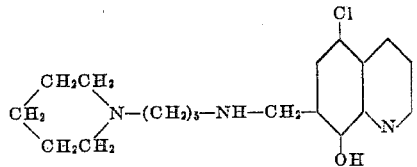

3. An acid addition salt of a compound having in its free base form the formula,

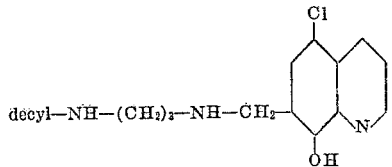

4. An acid addition salt of 5-chloro-7-(ethyl-β-hydroxyethylaminopropylaminoethyl)-8-quinolinol.

5. An acid addition salt of 5-chloro-7-(diethylaminopropylaminomethyl)-8-quinolinol.

6. An acid addition salt of 5-chloro-7-(diethylaminopropyl-ethylaminomethyl)-8-quinolinol.

References Cited in the file of this patent
UNITED STATES PATENTS
2,681,910   Burckhalter _____ June 22, 1954

OTHER REFERENCES
Burckhalter et al.: JACS, vol. 73, pp. 4837–39 (1951).